United States Patent [19]
Erwin et al.
[11] Patent Number: 4,616,260
[45] Date of Patent: Oct. 7, 1986

[54] TERMINAL HAVING USER SELECTABLE FASTER SCANNING

[75] Inventors: Douglas A. Erwin; Robert L. Skinner, both of Austin, Tex.
[73] Assignee: Data General Corporation, Westboro, Mass.

[21] Appl. No.: 470,699
[22] Filed: Feb. 28, 1983
[51] Int. Cl.[4] .......... H04N 5/04
[52] U.S. Cl. .......... 358/150; 358/152
[58] Field of Search .......... 358/150, 151, 148, 152, 358/140

[56] References Cited

U.S. PATENT DOCUMENTS

| | | | |
|---|---|---|---|
| 3,582,963 | 6/1971 | Bennett | 358/150 |
| 4,012,592 | 3/1977 | Ricard | 358/150 |
| 4,169,659 | 10/1979 | Marlowe | 358/150 |
| 4,316,219 | 2/1982 | Smith et al. | 358/150 |
| 4,386,368 | 5/1983 | Banks | 358/150 |
| 4,417,275 | 11/1983 | Harshbarger et al. | 358/150 |

*Primary Examiner*—Tommy P. Chin
*Assistant Examiner*—David E. Harvey
*Attorney, Agent, or Firm*—Robert L. Dulaney

[57] ABSTRACT

Apparatus and method for generating monitor synchronization signals in a terminal capable of operating at either a 31.5 Khz or 15.75 Khz horizontal video scan rate is disclosed. A first set of counters count incremental locations along each horizontal scan line. The outputs of these counters are provided to a memory which provides a blanking signal and three synchronization signals. The memory also provides a clocking input to a second set of counters which count horizontal scan lines. These second counters are preloaded to values which depend on the scan mode selected, the frame being displayed, the refresh rate and whether a vertical video or vertical blanking operation is underway. A second memory receives the outputs of the second counter set, the frame being displayed and the refresh rate signal and provides selection inputs used to choose the signals to be provided as the composite blanking and composite monitor synchronization signals.

6 Claims, 13 Drawing Figures

31.5 HORIZONTAL TIMING 15.75 HORIZONTAL TIMING 31.5 60Hz 31.5 50Hz 15.75 60Hz 15.75 50Hz

TERMINAL HAVING USER SELECTABLE FASTER SCANNING

BACKGROUND OF THE INVENTION

1. Field of the Invention

This application is related generally to video display terminals and more specifically to apparatus for generating a plurality of horizontal and vertical timing and synchronization signals for a bit-mapped raster scan terminal.

2. Description of the Prior Art

The picture displayed on a video monitor screen can be considered to consist of a large number of generally horizontal, parallel "raster lines" or lines of displayed information. As the monitor's electron beam scans along each line, location on the face of the cathode ray tube are stimulated. Each such location is commonly termed a pixel and the resolution of the screen is specified as the number of lines displayed multiplied by the number of pixels on each line. In a color monitor, the colors are generated by differentially activating red, blue and green electron guns which are aimed at three very close, but not coincident, points on the screen face.

Raster-scanned terminals are typically designed to display either a non-interlaced or an interlaced raster. In a non-interlaced terminal every raster line on the screen is scanned during every "frame" or vertical deflection cycle. Each frame is therefore a complete picture. In an interlaced terminal, every other raster line is scanned during each frame (either the "odd" lines or the "even" lines). It therefore takes two frames to make up a complete picture.

Normally, either 50 or 60 frames are completed per second, depending on the external electrical power available to the terminal. At 60 frames per second, the non-interlaced screen will be refreshed 60 times per second while the interlaced screen will be refreshed 30 times per second. A standard non-interlaced frame is commonly defined as having 525 raster lines. The actual number of lines of information which is displayed is somewhat less since some of the 525 are taken up by the retrace process. 525 lines per frame and 60 frames per second equals 31,500 lines per second or 31.5 KHz. The interlaced terminal, therefore, operates at one-half of this rate or 15.75 KHz. Since monitors commonly operate in only a single mode the timing and synchronization logic in prior art terminals typically is designed to operate only in an interlaced or a non-interlaced mode.

Raster scan graphics terminals are typically designed as either character or bit-mapped terminals. In character graphics, the displayed picture is made up of a combination of predefined alphanumeric characters and simple shapes, with each character or shape being a matrix of pixels (e.g. 8×10) which has a single address in terminal memory. In bit-mapped graphics, every pixel is associated with one or more locations in memory. In a monochrome terminal, a single bit per pixel would be adequate to describe the pixel state. In a color terminal, however, multiple bits per pixel are required. For example, if it is desired to be able to display up to 16 different colors on the screen simultaneously, each pixel must have four bits associated with it to define its color.

SUMMARY OF THE INVENTION

The present invention relates to a terminal having novel structure for accommodating either a 31.5 Khz scan rate or a 15.75 Khz scan rate. A preferred embodiment of the invention incorporates horizontal incremental counting logic, horizontal scan line counting logic, logic for generating synchronization signals and means for loading the scan line counters to different values based on the scan mode and the frame being displayed.

It is another feature of the invention that refresh rates of either 60 Hz or 50 Hz can be accommodated.

It is an advantage of the invention that the terminal can generate video synchronization signals for a monitor operating at the standard 15.75 Kz interlaced scan rate or a monitor operating at the higher resolution 31.5 Khz non-interlaced scan rate without hardware modification.

It is another advantage that the apparatus can operate with either a 50 or 60 Hz refresh rate to allow synchronization with the external electric power source, thereby reducing display flicker, without modification of the video timing and synchronization logic. Other features and advantages of the present invention will be understood by those of ordinary skill in the art after referring to the detailed description of the preferred embodiment and drawings herein.

DESCRIPTION OF THE PREFERRED EMBODIMENT

Interconnection

This section defines the structure and interconnection of one embodiment of the present invention in a graphics display terminal. The various signals mentioned in this interconnection section will be defined as they appear and are discussed in the operational section.

Figure 1:
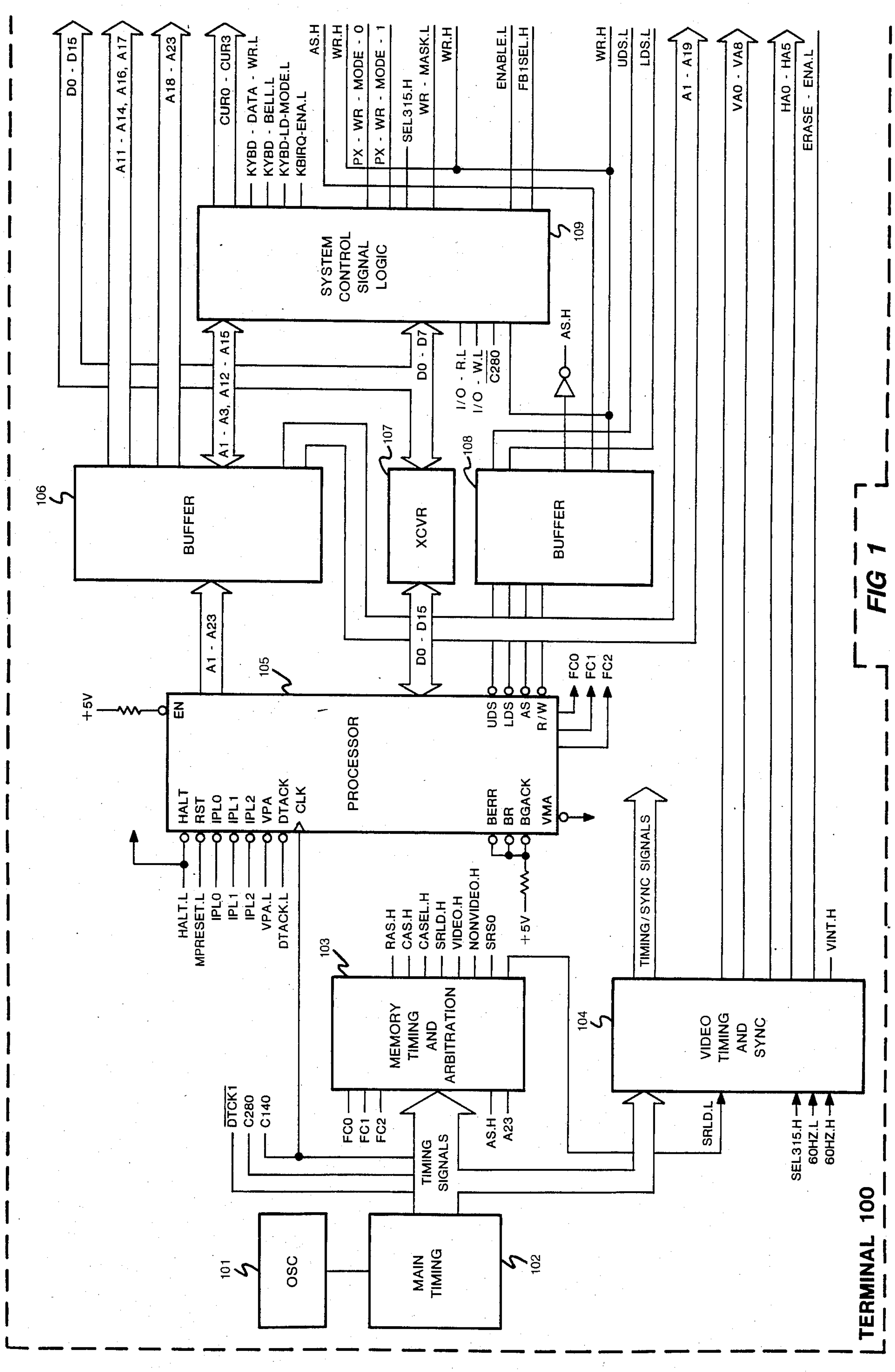
FIGS. 1 and 1A are a block diagram showing major functional elements of a raster-scanned terminal.
Figure 1A:
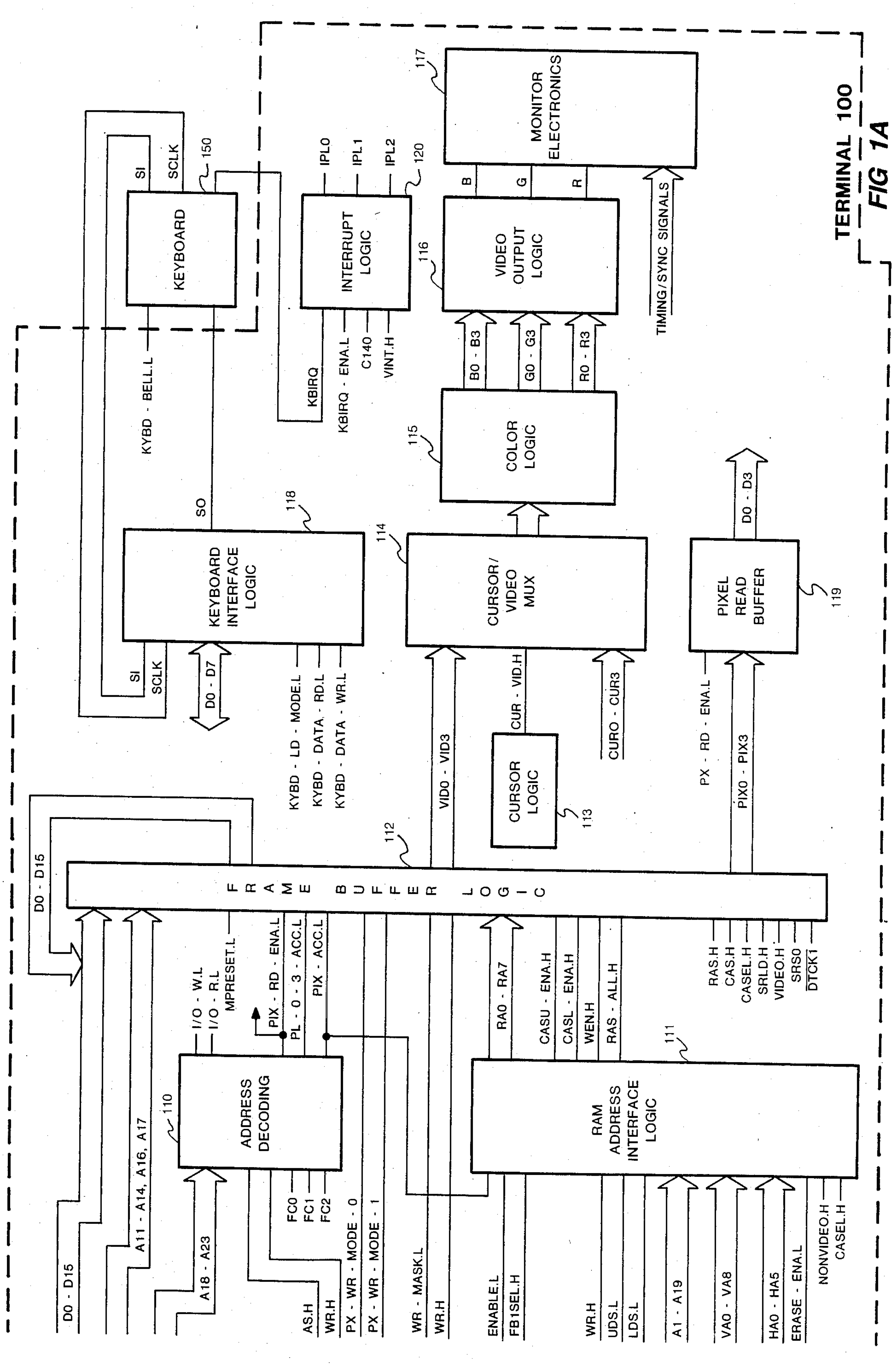

Looking first at FIG. 1 and FIG. 1A a block diagram of the major components of terminal 100 is shown. Oscillator 101 provides a master clocking signal to main timing 102. Main timing 102 provides several timing signals for use throughout terminal 100. Memory timing and arbitration 103 receives timing signals from main timing 102, FC0–FC2 from processor 105, A23 from buffer 106 and AS.H from buffer 108. Memory timing and arbitration 103 provides several timing signals for the operation of framer buffer logic 112 as described in more detail below. Video timing and sync 104 receives timing signals from main timing 102, SRLD.L from memory timing and arbitration 103, SEL315.H from system control signal logic 109, and 60 HZ.L and 60 HZ.H from user operable switches. Video timing and sync 104 provides timing/sync signals for use by monitor electronics 117, provides vertical and horizontal addresses VA0–VA8 and HA0–HA5 to RAM address interface logic 111 and provides ERASE-ENA.L to memory timing and arbitration 103. Processor 105, for example a Motorola MC68000, is clocked every 140 nanoseconds by C140 from main timing 102. Processor 105 receives HALT.L and MPRESET.L signals from reset circuitry, not shown, and interrupts IPL0–IPL2 from interrupt logic 120. Processor 105 can receive or transmit 16 bits of data information D0–D15 from or to transceiver 17. Processor 105 also provides 23 address bits A1–A23 to buffer 106, function code signals FC0–FC2 to address decoding 110 and UDS (upper data strobe), LDS (lower data strobe), AS (address strobe) and R/W (read/write status) to buffer 108. Buffer 106 provides address bit A23 to memory timing and arbitration 103, address bits A11–A14, A16 and A17 to frame buffer logic 112, address bits A18–A23 to address decoding 110, address bits A1–A3 and A12–A15 to system control signal logic 109 and address bits A1–A19 to RAM address interface logic 111.

Transceiver 107 provides data bits D0–D15 to frame buffer logic 112 and data bits D0–D7 to system control logic 109 and keyboard interface logic 118. Transceiver 107 also receives data bits D0–D15 from frame buffer logic 112 and data bits D0–D3 from pixel read buffer 119. Buffer 108 provides UDS.L, LDS.L, and WR.H to RAM address interface logic 111. Buffer 108 also provides AS.H and WR.H to address decoding 110 and provides AS.H to memory timing and arbitration 103. System control signal logic 109 receives address bits A1–A3 and A12–A15 from buffer 106, data bits D0–D7 from transceiver 107, WR.H from buffer 108, NOT C280 from main timing 102, I/O-R.L and I/O-W.L from address decoding 110. Address decoding 110 receives address bits A18–A23 from buffer 106, AS.H and WR.H from buffer 108, and FC0–FC2 from processor 105. RAM address interface logic 111 receives PIX-ACC.L from address decoding 110; ERASE.L and FB1SEL.H from system control signal logic 109; WR.H, UDS.L and LDS.L from buffer 108; address bits A1–A19 from processor 105; ERASE-ENA.L, VA0–VA8, and HA0–HA5 from video timing and sync 104; and NONVIDEO.H and CASEL.H from memory timing and arbitration 103. Frame buffer logic 112 receives data bits D0–D15 from transceiver 107; address bits A11–A14, A16 and A17 from buffer 106; MPRESET.L from the interrupt logic; PIX-RD-ENA.L, PL-0-3-ACC.L, PL4-7-ACC.L, PL-8-11-ACC.L, PL-12-

15-ACC.L and PIX-ACC.L from address decoding 110; WR-MASK.L, PX-WR-MODE-0, PX-WR-MODE-1 from system control signal logic 109; WR.H from buffer 108; address bits RA0–RA7 from RAM address interface 'logic 111; CASU-ENA.H, CASL-ENA.H, WEN.H, RAS-ALL.H from RAM address interface logic 111; and RAS.H, CAS.H, CASEL.H, SRLD.H, VIDEO.H, SRS0, and NOTDTCK1 from memory timing and arbitration 103. Cursor/video mux 114 receives video signals VID0–VID3 from frame buffer logic 112, cursor video signals CUR0–CUR3 from system control signal logic 109 and CUR-VID.H from cursor logic 113. Color logic 115 receives the multiplexed cursor and video information from cursor/video mux 114 and provides 4 bits of blue color information B0–B3, 4 bits green information G0–G3, and 4 bits of red color information R0–R3 to video output logic 116 which provides the blue, green and red video signal to monitor electronics 117. Monitor electronics also receives timing and synchronization signals from video timing and sync 104. Keyboard interface logic 118 receives data bits D0–D7 from transceiver 107, KYBD-LD-MODE.L, KYBD-DATA-RD.L, KYBD-DATA-WR.L, KBIRQ-ENA.1, from system control signal logic 109, clock signal C140 from main timing 102, and KBIRQ, SCLK and SI from keyboard 150. Keyboard 150 receives output data stream S0 from keyboard interface logic 118 and KYBD-BELL.L from system control logic 109. Pixle read buffer 119 receives PIX0–PIX3 from frame buffer logic 112 and PIX-RD-ENA.L from address decoding 110. The four values of PIX0–PIX3 are provided to XCVR 107 over lines D0–D3.

Figure 2:
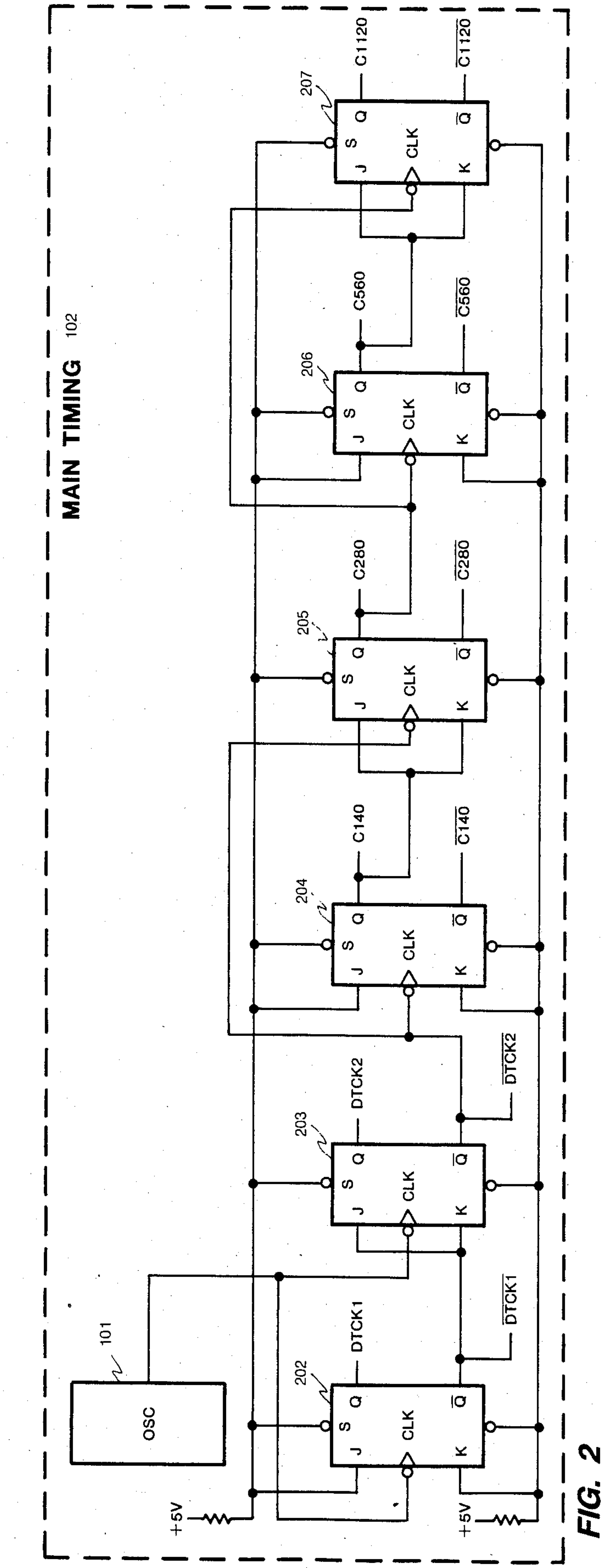
FIG. 2 is a schematic diagram of main timing 102.
Figure 3:
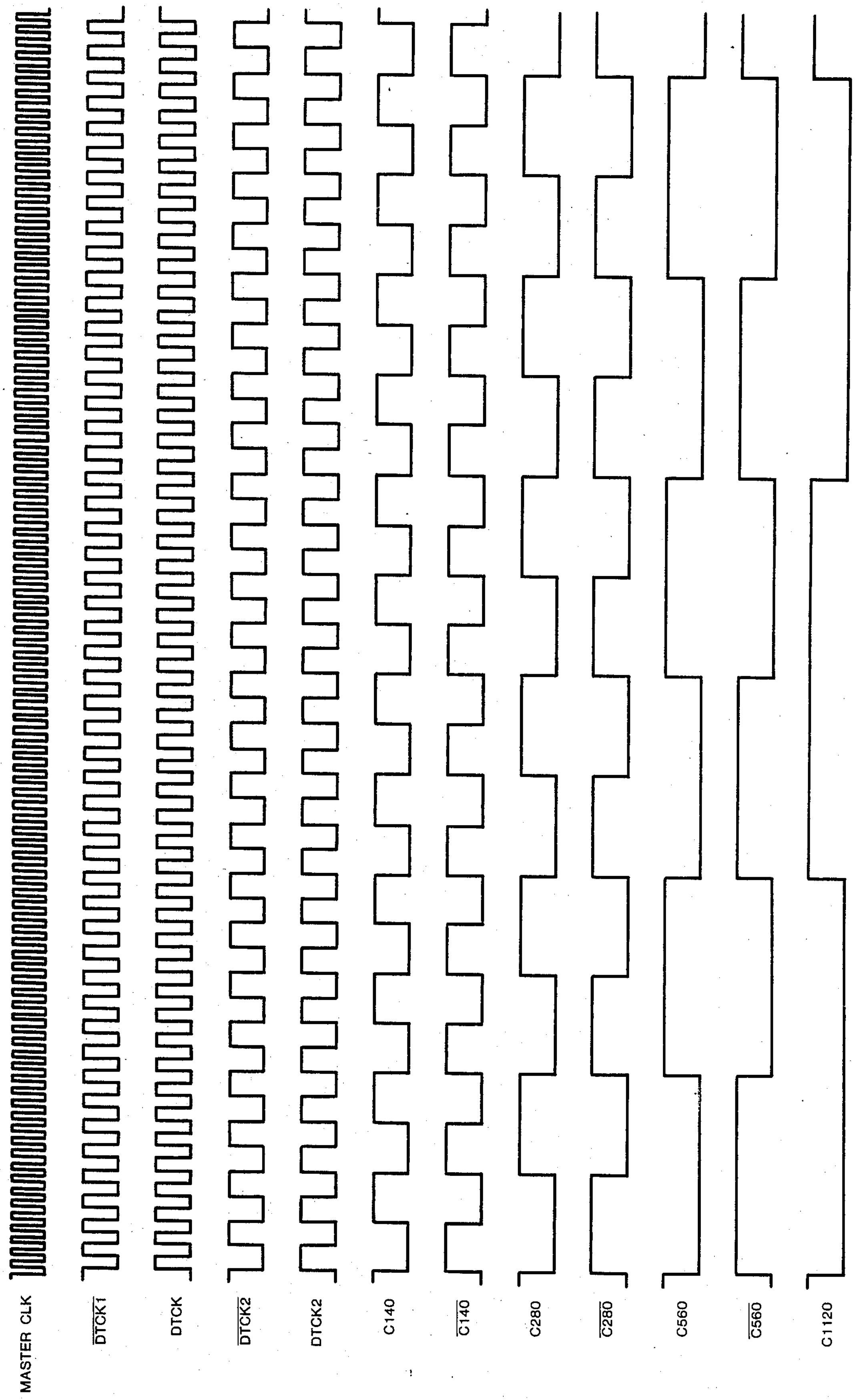
FIG. 3 is a timing diagram showing the relationship of the signals generated by main timing 102.

FIG. 2 shows a schematic diagram of main timing 102. Flip flops 202–207 are interconnected such that timing signals having a variety of frequencies are available for terminal use. Oscillator 101 (for example, a Motorola K1100 Series) provides a master clock signal, in this embodiment 57.398 megahertz, to the clocking input of flip flop 202 and 203. The J and K inputs to flip flop 202, 204 and 206 are held high. The NOTQ output of flip flop 202, NOTDTCK1, is provided to the J and K inputs of flip flop 203. The NOTQ output of flip flop 203, NOTDTCK1, is provided as a clocking signal to flip flops 204 and 205. The J and K inputs of flip flop 204 are held high. The Q output of flip flop 204, C140, is provided to the J and K inputs of flip flop 205. The Q output of flip flop 205, C280, is provided as a clocking signal to flip flops 206 and 207. The Q output of flip flop 206, C560, is provided to the J and K inputs of flip flop 207. The S and R inputs of flips flops 202–207 are all held high. For ease of understanding, some timing signal names indicate their approximate period. For example, C140 has a period of approximately 140 nanoseconds, C280 has a period of approximately 280 nanoseconds, and so forth. FIG. 3 illustrates the relationship between the various timing signals generated by oscillator 201 and flip flops 202–207. These timing signals are provided to various locations in terminal 100.

Figure 2A:
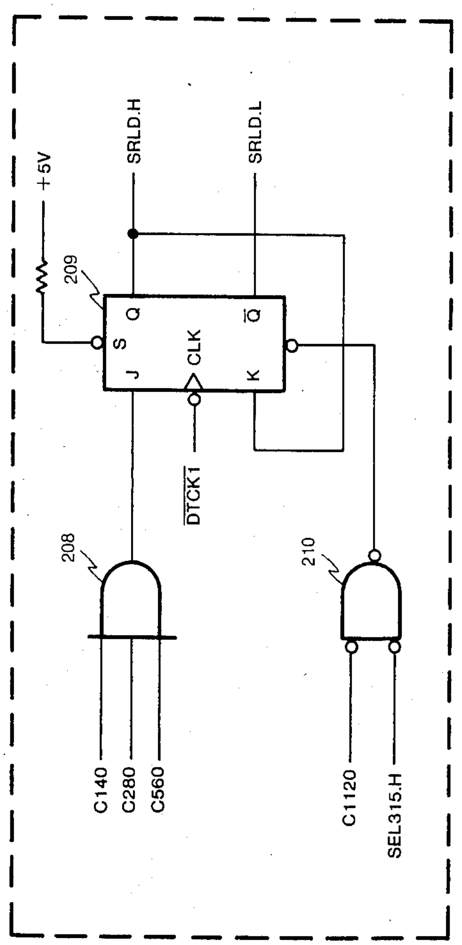
FIG. 2A is a schematic diagram of a portion of memory timing and arbitration 103.

FIG. 2A shows the schematic diagram for generation of timing signal SRLD.L, discussed below in regard to clocking of the horizontal timing logic. Signals C140, C280 and C560 are provided to the inputs of AND gate 208. The output of gate 208 is supplied to the J input of flip flop 209. The K input of flip flop 209 is connected from the Q output of flip flop 209. Signals C1120 and SEL315.H, which indicates that the 31.5 Khz mode has been selected, are supplied to NAND gate 210. The output of gate 210 is connected to the R input of flip flop 209. The S output of flip flop 209 is held high.

Figure 4:
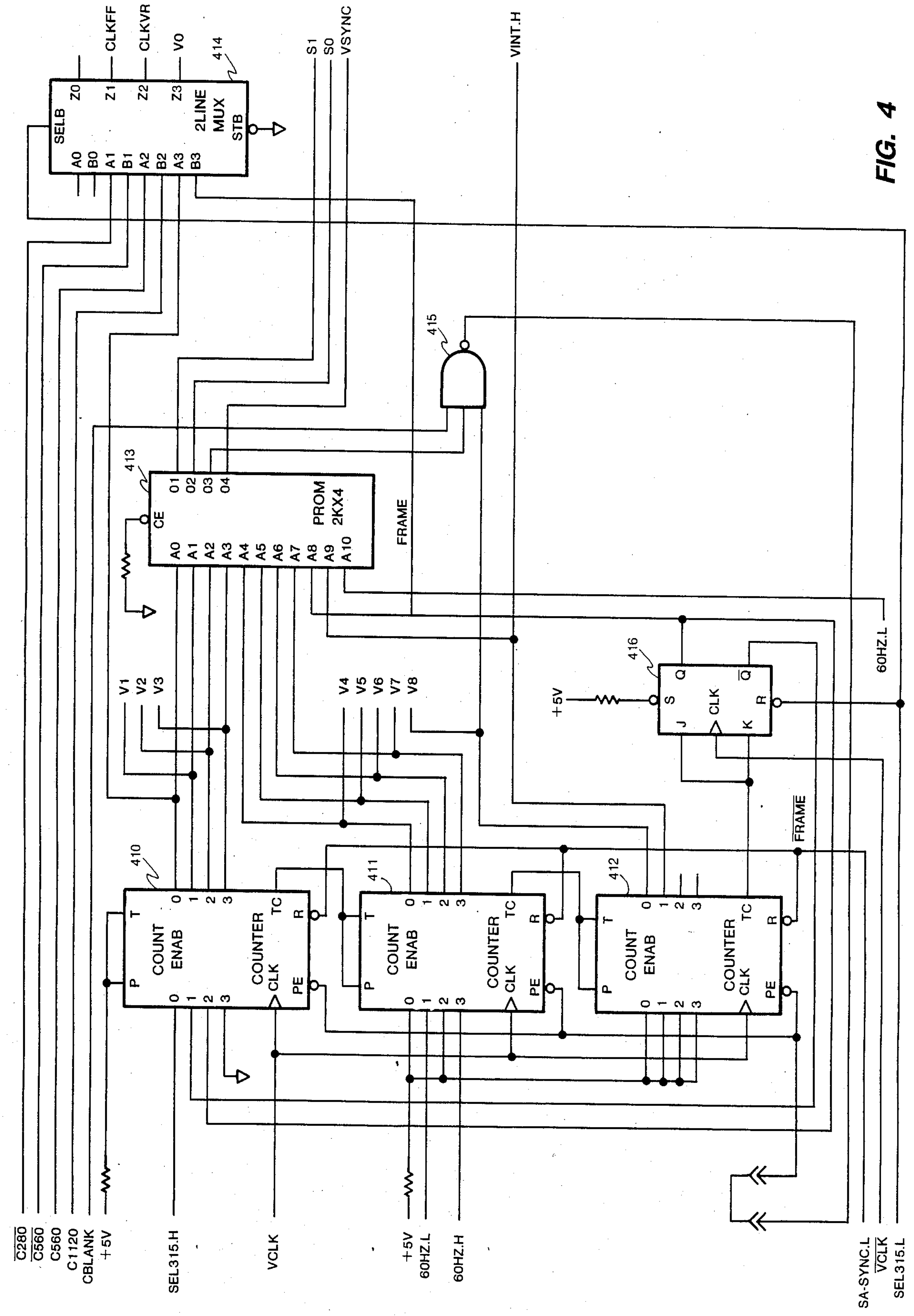
FIGS. 4 and 4A are a schematic diagram of video timing and sync 104.
Figure 4A:
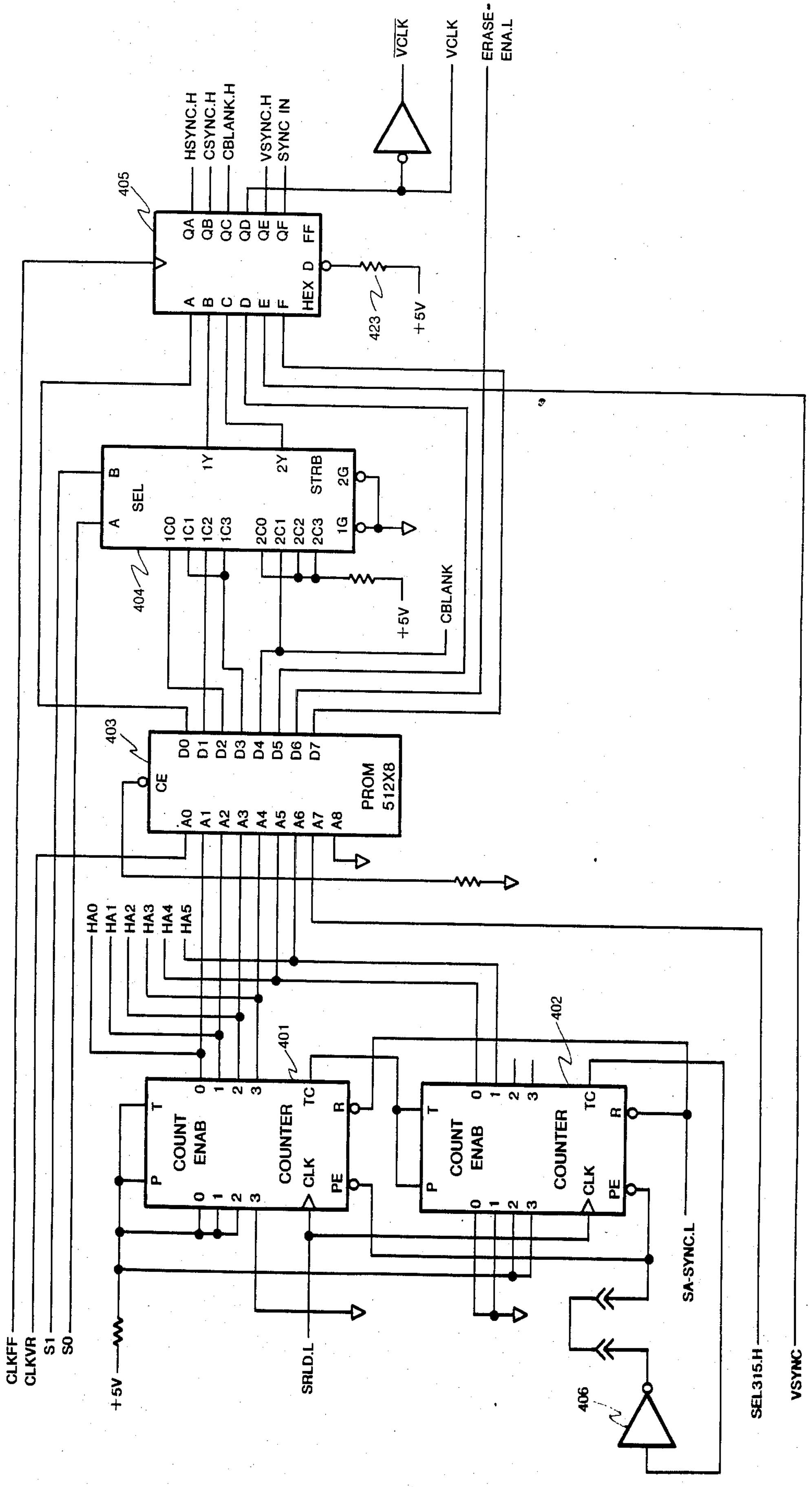

FIGS. 4 and 4A show a schematic diagram of vertical timing and sync 104. The P and T inputs of counter 410 are held high. The P and T inputs of counter 411 are connected to the TC output of counter 410 and the P and T inputs of counter 412 are connected to the TC output of counter 411. Counters 410, 411 and 412 are therefore interconnected to form a 12-bit raster line counter clocked by VCLK, generation of which is explained in more detail below. Input 0 of counter 410 is connected to SEL315.H which indicates whether the terminal is operating in a 31.5 Khz mode or a 15.75 Khz mode. Input 1 of counter 410 is connected to output NOTQ of flip flop 416. Input 2 of counter 410 is connected to the Q output of flip flop 416. Input 3 of counter 410 is held low. Input 0 and 2 of counter 411 are held high. Input 1 of counter 411 is connected to the signal 60 HZ.L and input 3 of counter 411 is connected to the signal 60 HZ.H. 60 HZ.L and 60 HZ.H indicate the type of external electric power available to the terminal and therefore the required vertical frame rate. All four inputs to counter 412 are held high.

The reset inputs of counter 410–412 are connected to SA-SYNC.L which is used only for terminal testing and is normally held high. The PE inputs of counters 410–412 are connected to the output of NAND gate 415. The outputs 0–3 of counter 410 are provided to inputs A0–A3 respectively of PROM 413. The outputs of 0–3 of counter 411 are provided to the inputs of A4–A7 respectively of PROM 413. Output 0 of counter 412 is provided to NAND gate 415 and output 1 of counter 412 is provided to input A9 of PROM 413. Counter 410 outputs 1–3, counter 411 outputs 0–3 and counter 412 output 0 are also provided to RAM address interface logic 111, along with V0 from multiplexer 414, as a 9-bit vertical address V0–V8. PROM 413 also receives the Q output of flip flop 416 at input A8 and the signal 60 HZ.L at input A10. The TC output of counter 412 is connected to the J and K inputs of flip flop 416, which is clocked by NOTVCLK. The Q output of flip flop 416 is provided to counter 410, PROM 413 and multiplexer 414. The S input to flip flop 416 is held high while the R input is connected to SEL 315.L.

Outputs 1 and 2 of PROM 413 are provided to multiplexer 404 (FIG. 4A). Output 3 of PROM 413 is provided to NAND gate 415 and output 4 of PROM 413 is provided to HEX flip flop 405 (FIG. 4A) as discussed below. NAND gate 415 also receives the signal CBLANK from PROM 403 (FIG. 4A). Two-line multiplexer 414 receives timing signal NOT C280 at input A1, NOT C560 at input B1, C560 at input A2, C1120 at input B2, output 0 of counter 410 at input A3 and the Q output of flip flop of 416 at input B3. Selection between the A inputs and the B inputs to multiplexer 414 is controlled by the signal SEL315.L. Output Z1, CLKFF, is provided as the clocking input to HEX flip flop 405 (FIG. 4A). Output Z2, CLKVR, is provided as input A0 to PROM 403 (FIG. 4A).

Looking now at FIG. 4A the P and T inputs of counter 401 are held high. The P and T inputs of counter 402 are connected to the TC output of counter 401. The TC output of counter 402 is inverted and connected to the PE inputs of both counters 401 and 402. The R inputs of counters 401 and 402 are connected to SA-SYNC.L. Inputs 0–2 of counter 401 are held high. Input 3 of counter 401 is held low. Inputs 0 and 1 of counter 402 are held low and inputs 2 and 3 of counter 402 are held high. Both counter 401 and counter 402 are clocked by signal SRLD.L, supplied from memory timing and arbitration 103, described above. Outputs 0–3 of counter 401 are provided to inputs A1–A4 respectively of PROM 403. Outputs 0 and 1 of counter 402 are provided to inputs A5 and A6 of PROM 403. Input A0 of PROM 403 is connected to output 02 of multiplexer 414, input A7 is connected to SEL315.H, and input A8 is held low. Counter 404 outputs 0–3 and counter 402 outputs 0 and 1 are also supplied to RAM address interface logic 111 as a 6-bit horizontal address H0–H5. H0–H5 and V0–V8 are used to generate terminal memory addresses for certain memory access operations.

Output D0 of PROM 403 is connected to the A input of hex flip flop 405. Output D1 of PROM 403 is connected to the input 1C2 of multiplexer 404. Output 2 of PROM 403 is connected to input 1C0 of multiplexer 404. Output 3 of PROM 403 is connected to input 1C1 and 1C3 of multiplexer 404. Output 4 of PROM 403 is connected to input 2C1 of multiplexer 404 and to NAND gate 415. Output 5 of PROM 403 is connected to input D of flip flop 405. Output 6 of PROM 403, ERASE.ENA-L, is provided to RAM address interface logic 111. Output 7 of PROM 403 is provided to the F input of flip flop 405. Input 2C0, 2C2 and 2C3 of multiplexer 404 are held high. Selection among the inputs to multiplexer 404 is made in response to outputs 1 and 2 of PROM 413. The strobe inputs multiplexer 404 are held low. The 1Y output of multiplexer 404 is provided to the B input of flip flop 405 and the 2Y output of multiplexer 404 is provided to the C input of flip flop 405. Input E of flip flop 405 is connected to output 4 (VSYNC) of PROM 413. Flip flop 405 is clocked by output 01 (CLKFF) of multiplexer 414. The outputs of flip flop 405 are a horizontal sync signal (HSYNC.H), a composite sync signal (CSYNC.H), a composite blank signal (CBLANK.H), a vertical clock signal (VCLK), a vertical sync signal (VSYNC.H), and a power supply synchronization signal (SYNC IN).

Operation

First, referring to FIGS. 1 and 1A, a brief overview of terminal 100 operation will be given. Terminal 100 is generally under the supervision and control of processor 105 by means of address lines A1–A23, bidirectional data lines D0–D15 and other discrete output lines discussed in more detail below. Timing signals for all terminal 100 operations are generated by main timing 102 and distributed throughout the system. Memory timing and arbitration 103 generates the particular timing signals required for proper operation of frame buffer logic 112. Video timing and sync 104, based on the scan mode of the terminal, the external power available and certain timing signals from main timing 102 and memory timing and arbitration 103 generates 6 bits of information indicating the horizontal location of the electron beam and 9 bits of information indicating the vertical position of the beams. In addition, video timing and sync 104 generates the various timing and synchronizing signals required by monitor electronics 117 (e.g. composite sync, horizontal sync, vertical sync and composite blank signals).

Frame buffer logic 112 receives data and address information from processor 105, enabling and control inputs from address decoding 110 and system control signal logic 109, RAM address and control information from RAM address interface logic 111 and timing signals from memory timing and arbitration 103. Based on these signals, data or instructions will either be retrieved from or stored in the proper locations in the frame buffer logic 112 RAM memory. Information to be returned to processor 105 is provided over data lines D0–D15. The 4 bits of information for the pixel to be displayed is provided at the pixel rate over lines VID-0–VID3. Cursor/video multiplexer 114 receives the video information and, at the appropriate horizontal and vertical positions, integrates the cursor display information with the video data stream. The pixel information is then provided to color logic 115 where the four bits of pixel information are used to select one of 16 colors for display. Color logic 115 outputs four bits of blue, four bits of green and four bits of red information to video output logic 116 where the blue, green and red analog signals are generated for use by monitor electronics 117. Pixel information PIX0–PIX3 is held in pixel read buffer 119 and made available to XCVR 107 over data lines D0–D3.

Keyboard interface logic 118 receives an interrupt signal, a clocking signal and serial data from keyboard 150, control information from system control signal logic 109 and C140 from main timing 102. Interface logic 118 receives data from and makes data available to processor 105 over data lines D0–D7, Data to be sent to keyboard 150 is provided over serial data line S0. A bell activation signal is provided to keyboard 150 from system control signal logic 107.

As mentioned above a terminal incorporating the subject invention can operate in either a 31.5 KHZ or a 15.75 KHZ horizontal video scan rate mode without hardware modification. In-addition variations in frame rate to synchronize with an external power supply of either 50 hertz and 60 hertz can be accommodated. FIGS. 5 through 10 are timing diagrams illustrating operation of video timing and sync 104 under these various conditions.

Looking first to FIG. 2A, the generation of timing signal SRLD.L will be discussed. Considering first the 31.5 Khz case, SEL 315.H, which indicates that 31.5 Khz mode has been selected, will be high. The output of NAND gate 210 in FIG. 2A will, therefore, be high and will not affect the operation of flip-flop 209. Since the output of AND gate 208 will be high only when C140, C280 and C560 are all high simultaneously, SRLD.L will normally be high, SRLD.H will normally be low and the J and K outputs to flip flop 209 will be low. At the first DTCK1 falling edge after the output of AND gate 208 goes high SRLD.H will go high and SRLD.L will go low. Since SRLD.H is returned to the K input of flip flop 309, SRLD.L will return high at the next NOTDTCK1 falling edge. In the 31.5 Khz mode, therefore, SRLD.L has a period of 560 nanoseconds. Of the 560, SRLD.L is high for 525 nanoseconds and low for 35 nanoseconds (i.e. low for one DTCK1 period).

In the 15.75 Khz mode, SEL315.H will be low. When C1120 is also low, the output of NAND gate 210 will be low, forcing SRLD.L to stay high regardless of the output of AND gate 208. When C1120 is high (every other 560 nanoseconds) the output of NAND gate 210 is high and flip flop 209 will operate as in the 31.5 Khz mode. Therefore, in the 15.75 Khz mode, SRLD.L will have a period of 1120 nanoseconds, of which it is high for 1085 and low for 35.

Referring back to FIG. 4A, it can be seen that counter 401 and counter 402 are connected so as to form an 8-bit counter which is incremented at each rising edge of SRLD.L. Since counter 401 and 402 each have 4-bit inputs and 4-bit outputs they can most easily be discussed in hexadecimal format. At each rising edge of SRLD.L the value supplied by counters 401 and 402 to PROM 403 will be incremented. At the next SRLD.L pulse after counters 401 and 402 have reached a hexadecimcal total of FF, the TC output of counter 402 will go high and inverter 406 will apply a low pulse to the PE inputs of 401 and 402 causing the counters to reset to the preloaded hexadecimal value of C7. With a hexadecimal preload of C7, 57 counts will be required to fill counters 401 and 402. As explained above in regard to FIG. 2A, the frequency of SRLD.L will vary depending on whether the mode selected is 31.5 Khz or 15.75 Khz. The 57 SRLD.L pulses are equivalent to one complete horizontal raster line scan cycle (i.e. video and blanking).

Figure 5:
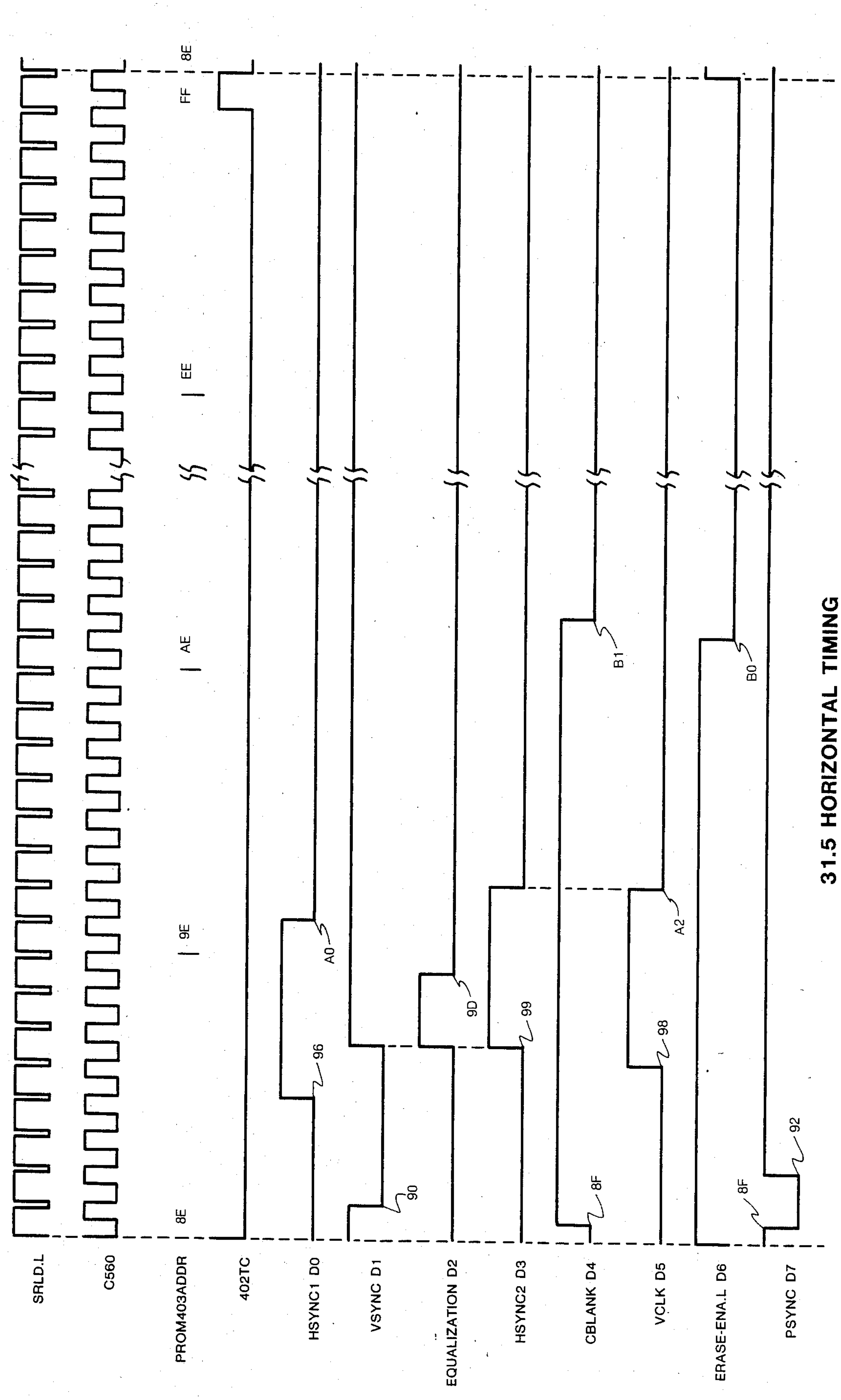
FIG. 5 is a timing diagram of 31.5 horizontal timing.

Looking now at FIGS. 4, 4A and 5, the case of a terminal operating in the 31.5 Khz mode will be considered. Since SEL 315.L will be low, the A inputs to multiplexer 414 will be selected as the sources of CLKFF and CLKVR. Input A0 to PROM 403 will, therefore, be clock signal C560 and input A7 to PROM 403 will be high. Considering inputs A0 to A3 of PROM 403 as being one hexadecimal digit and inputs A4 to A7 as being a second hexadecimal digit it can be seen that the initial address supplied to PROM 403, expressed in hexadecimal form, is 8E. Looking now at the timing diagram as shown in FIG. 5, SRLD.L and C560 are represented. Also the hexadecimal input address to PROM 403, the TC output of counter 402 and the 8 outputs D0–D7 of PROM 403 are represented. Looking at the left hand side of FIG. 5, at the next SRLD.L clock pulse after counter 401 and 402 have reached the count FF, 402 TC goes low thereby resetting counter 401 and 402 to the preloaded value of C7 (i.e. PROM 403 address 8E). SRLD.L in the 31.5 mode has a period of 560 nanoseconds. It can be seen that since clock signal C560 is provided to the lowest order input bit of PROM 403, the addresses provided to PROM 403 will vary with the rising edge of both the SRLD.L pulses and the C560 pulses. Each address A0–A7 provided at the input of PROM 403 will result in 8 output bits D0–D7 provided at the outputs of PROM 403. Though SRLD.L is incremented 57 times per horizontal scan, the clock signal C560 provided to lowest order bit A0 of PROM 403 results in a total of 114 different addresses being provided to inputs A0–A7 of PROM 403. The hexadecimal address at which each change in an output of PROM 403 occurs is indicated in FIG. 5. Output D0 (HSYNC1) is initially low, goes high at PROM 403 input address 96 and returns low at address A0. Output D1 (VSYNC) is initially high, goes low at address 90 and returns high at address 99. Outputs D2 and D3 (EQUALIZATION) and (HSYNC2) are both initially low and both go high at address 99. Output D2 returns low at address 9D while output D3 returns low at address A2. Output D4 (CBLANK) is initially low, goes high at address 8F and returns low at address B1. Output D5 (VCLK) is initially low, goes high at address 98 and returns low at address A2. Output D6 (ERASE-ENA.L) mentioned above, goes high at address 8E and returns low at address B0. Finally, output D7 (PSYNC) is initially high, goes low at address 8F and returns high at address 92.

Briefly defining the above signals HSYNC1 is the horizontal synchronization for the internal monitor in this embodiment, VSYCN is a vertical synchronization signal used as the source of the composite sync (CSYNC) signal during the vertical sync period, discussed below. EQUALIZATION is used as the source of the CSYNC signal during the equalization period, discussed below. HSYNC2 is a horizontal sync signal used as the source of CSYNC for an external monitor during the video period and the blanking horizontal sync period, discussed below. CBLANK is a composite blanking signal used by monitor electronics 117 to blank the red, green and blue signals. VCLK is a clocking signal supplied to counters 410–412. ERASE-ENA.L enables blanking of the display screen to a single color. Finally PSYNC in this embodiment is a terminal power supply synchronization signal. As will be appreciated by those skilled in the art, color monitors typically require only a composite sync signal and the red, blue and green video information. A composite blank signal is required to blank the video information, but is typically not sent to the monitor. Signals HSYNC.H and VSYNC.H are special signals generated in this particular embodiment, but are not commonly required for operating of a typical monitor.

Figure 6:
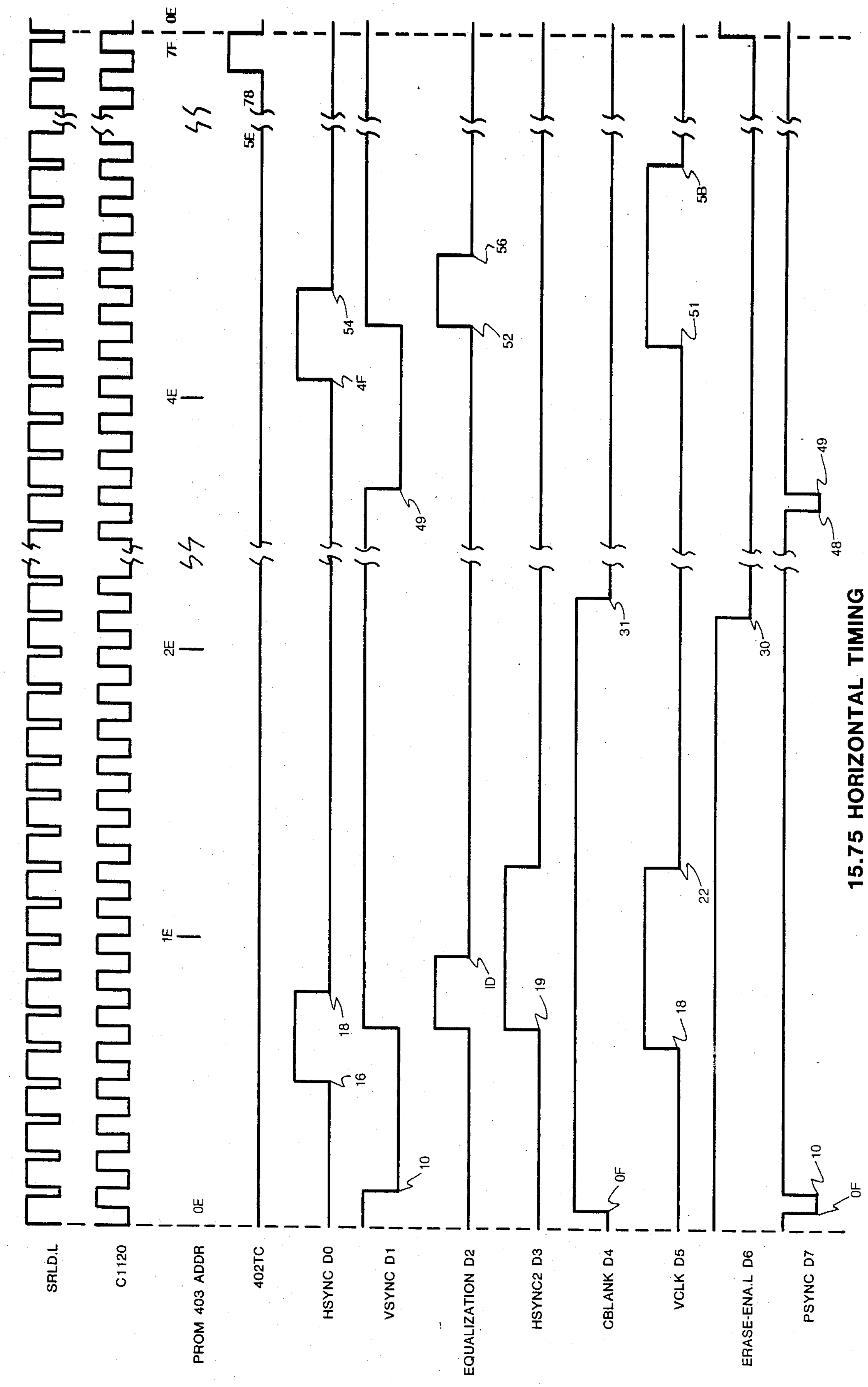
FIG. 6 is a timing diagram of 15.75 horizontal timing.

Referring now to FIG. 6, the 15.75 Khz horizontal timing case is shown. It can be seen that in this case SEL315.L will be high and, rather than the C560 clock as was the case above, multiplexer 414 will select the C1120 clock to be provided to input A0 of PROM 403. As discussed above, the period of SRLD.L is 1120 nanoseconds in the 15.75 mode. Since SRLD.L is being clocked at one-half the 31.5 mode rate the elapsed time for a complete horizontal scan will be twice that required in the 31.5 mode. However, since only one-half of the raster lines are being scanned in the 15.75 mode the total time for frame scanning will be substantially equal in either of the 2 modes. Referring to FIG. 6, it can be seen that, while the total elapsed time for one horizontal scan in the 15.75 case is twice that required in the 31.5 case, certain output pulses of PROM 403 will occur at the same time regardless of the mode. That is, certain of the outputs of PROM 403 are required by the terminal electronics to occur twice during the 15.75 horizontal scan mode as compared with once during the more rapid 31.5 mode. Specifically, outputs D0, D1, D2, D5, and D7 each have two pulses in the 15.75 mode whereas they have only one in the 31.5 mode. It can further be seen that the pulses occur one-half of a horizontal scan period apart and are therefore equally spaced throughout the 15.75 horizontal scanning.

Turning now to vertical counting and referring again to FIG. 4, it can be seen that counters 410–412 have a varying set of inputs depending on the scanning mode, the external power available and the frame currently being displayed. In the 15.75 Khz mode, the two frames required to make up a complete picture are identified as frame 0 and frame 1. In the 31.5 Khz mode, each frame is a complete picture and FRAME is held low. Considering PROM 413 inputs A0–A3 as one hexadecimal digit, A4–A7 as a second and A8–A10 as a third, Table I below shows the counter 410–412 preloads and PROM 413 addresses resulting from the various combinations of these conditions. These preloads, as discussed below, will only come into effect during the blanking periods.

TABLE I

| | SEL315.H | 60HZ.L | 60HZ.H | FRAME | COUNTER 410–412 PRELOAD | ROM 413 PRELOAD |
|---|---|---|---|---|---|---|
| 31.5/60 | 1 | 0 | 1 | 0 | FD3 | 2D3 |
| 31.5/50 | 1 | 1 | 0 | 0 | F73 | 673 |
| 15.75/60/F0 | 0 | 0 | 1 | 0 | FD2 | 2D2 |
| 15.75/60/F1 | 0 | 0 | 1 | 1 | FD4 | 3D4 |
| 15.75/50/F0 | 0 | 1 | 0 | 0 | F72 | 672 |
| 15.75/50/F1 | 0 | 1 | 0 | 1 | F74 | 774 |

Figure 7:
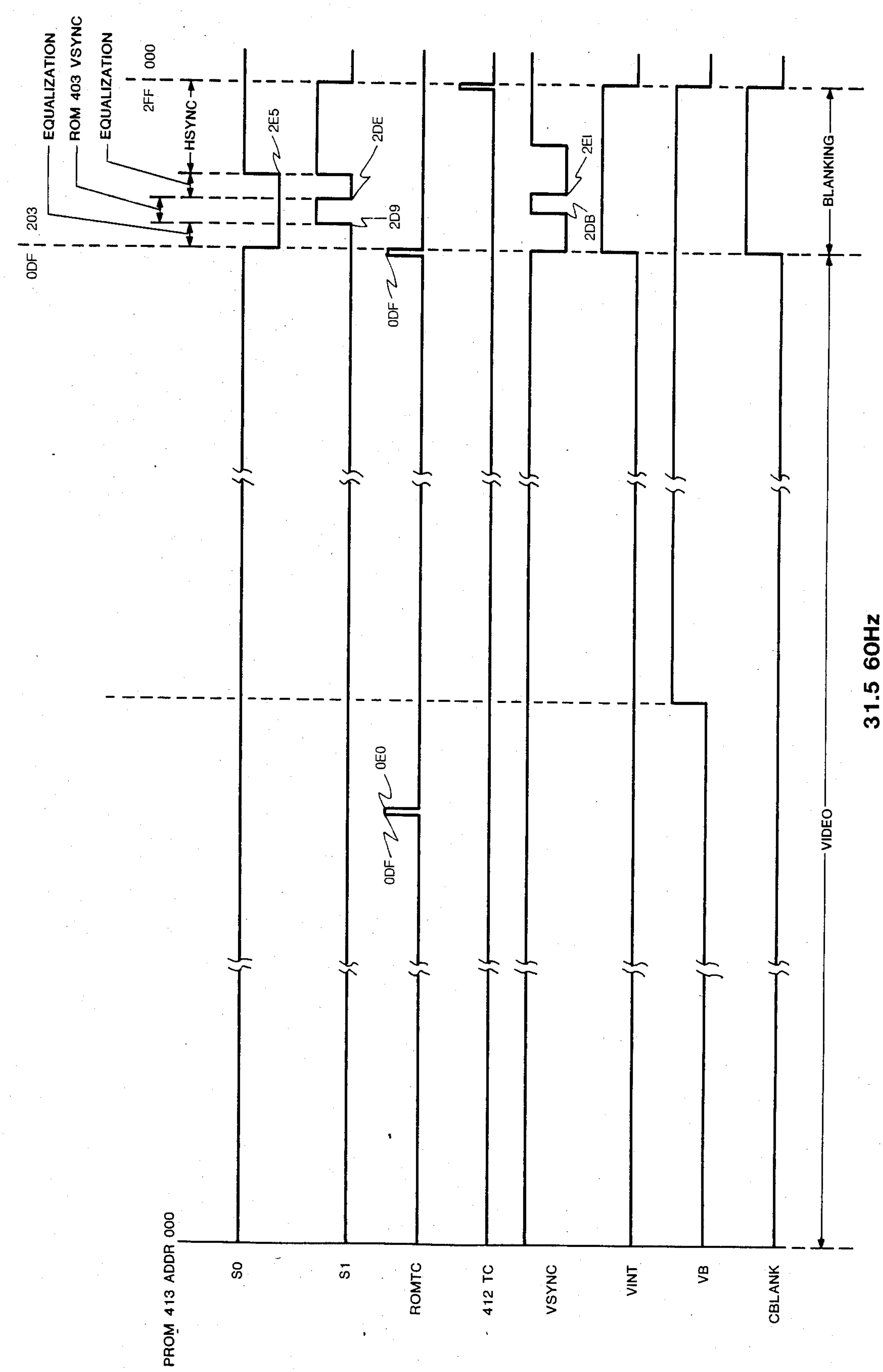
FIG. 7 is a timing diagram of 31.5, 60 Hz non-interlaced vertical timing.
Figure 8:
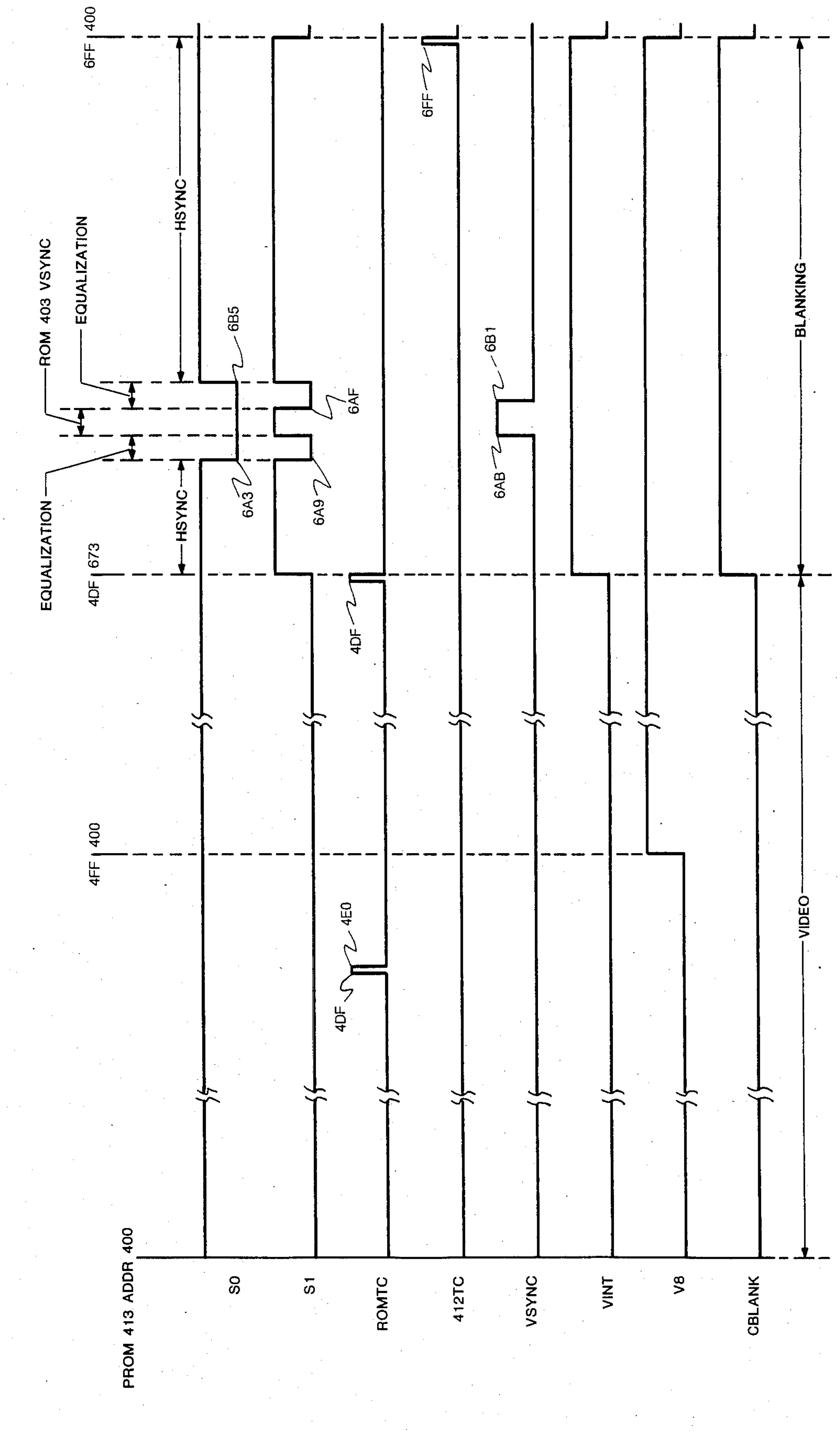
FIG. 8 is a timing diagram of 31.5, 50 Hz non-interlaced vertical timing.

Looking now at FIGS. 4 and 7, the case of a 31.5 Khz scan rate mode with 60 hertz frame rate will be discussed. FIG. 7 (as well as FIGS. 8–10) starts with the beginning of a video period and continues through a complete screen refresh cycle. At the start of the video period in this case, the output of counters 410–412 is hexadecimal 000, 60 HZ.L is low and FRAME from flip flop 416 is held low by SEL315.L being low. The hexadecimal input address to PROM 413 corresponding to 410–412 outputs 000 is 000. At each VCLK rising edge, counters 410–412 will be incremented. FIG. 8 shows the status of the 4 outputs of PROM 413 (S0, S1, VSYNC and ROM TC), the TC output of counter 412 (412 TC) and the 0 and 1 output of counter 412 (V8 and VINT.H). At the address 000 to PROM 413, outputs S1, ROMTC and VSYNC are initially low and output S0 is initially high. No change in the four outputs occurs until PROM address 0DF, at which time ROMTC goes high for one VCLK pulse then returns low. Since output 0 of counter 412 is low, the output of NAND gate 415 remains high and no low signal is imposed on the PE inputs to counters 410–412. At the next clock pulse after the count 0FF, output 0 of counter 412 (V8) goes high. The input address to PROM 413 returns to 000. When the PROM 413 address 0DF is reached ROMTC again goes high. Referring briefly to FIG. 5, CBLANK is high at the time of the rising edge of VCLK, therefore, the three inputs to NAND gate 415 are satisfied and the output of 415 goes low thereby asserting a low signal at the PE inputs to counters 410–412. This causes the inputs to counters 410–412 to preload the counters to hexadecimal FD3. This causes vertical interrupt signal VINT.H to go high, notifying processor 105 of a blanking period, at the next VCLK rising edge. PROM 413 now sees an input address of 2D3.

During the foregoing vertical video period, output S0 of PROM 413 has remained high and output S1 has remained low. These two outputs are provided to multiplexer 404 as the selecting inputs. Therefore during the vertical video period, multiplexer 404 inputs 1C1 (HSYNC) and 2C1 (CBLANK) have been selected to be provided on outputs 1Y and 2Y. As soon as address 2D3 is provided to PROM 413, S0 goes low causing multiplexer 404 inputs 1C0 (EQUALIZATION) and 2C0 to be provided at the multiplexer outputs. At the next rising edge of CLKFF (NOT C280 in the 31.5 Khz mode) the inputs to flip flop 405 are provided at the outputs of flip flop 405. This initiates the equalizing pulse interval period. After six horizontal scan periods, at PROM address 2D9, PROM 413 output S1 goes high causing inputs 1C2 (VSYNC) and 2C2 to be provided to the multiplexer 404 outputs. The next rising edge of CLKFF will terminate the equalization period and initiate the vertical synchronization pulse interval. After six horizontal scan periods, at PROM address 2DE, output S1 of PROM 413 again goes low, initiating another equalizing pulse interval at the next rising edge of CLKFF. Finally, at PROM address 2E5 both S0 and S1 go high initiating the horizontal synchronization pulse period at the next CLKFF rising edge. Horizontal sync continues until the total count of counters 410–412 reaches FFF (PROM 413 address 2FF). At the next VCLK rising edge, counters 410–412 will reset to 000; S1, VINT, V8 and CBLANK will go low; and the video portion of the vertical timing will again be repeated.

Looking now at FIG. 8 a similar vertical timing diagram for the 50 hertz external power case is given. Since only 50 vertical scans of the screen will be performed per second the total time which elapses for each vertical scan cycle will be longer in the 50 hertz case. This extra time is inserted into the blanking period while the length of the video period timing remains the same. Looking now at FIG. 8 together with FIGS. 4 and 4A, it can be seen that the signals during the video period begin at the PROM 413 hexadecimal address 400, since 60 HZ.L is high in this case. The signals during the video period are identical to those during the 60 Hz video period. At the second falling edge of ROMTC, counters 410–412 are preloaded to a hexadecimal count of F73, which causes PROM 413 to see the address 673. In this case S1 will go high causing the inputs 1C3 and 2C3 of multiplexer 404 to be provided to the multiplexer outputs thereby initiating a horizontal sync period at the next CLKFF rising edge. Horizontal sync continues from PROM 413 address 673 until PROM 413 address 6A3 at which time S0 and S1 go low for the six horizontal scan cycles of the equalization period. As explained above, this is followed by the vertical sync (S0 low, S1 high) and another equalization (S0 and S1 low), each being six horizontal scans in duration. At PROM address 6B5, S1 and S0 again go high causing another horizontal synchronization period which continues unitl PROM address 6FF. The total number of VCLK pulses (i.e. horizontal scan periods) during 50 hertz blanking will therefore, be 141 versus 45 VCLK pulses during the 60 hertz blanking.

Figure 9:
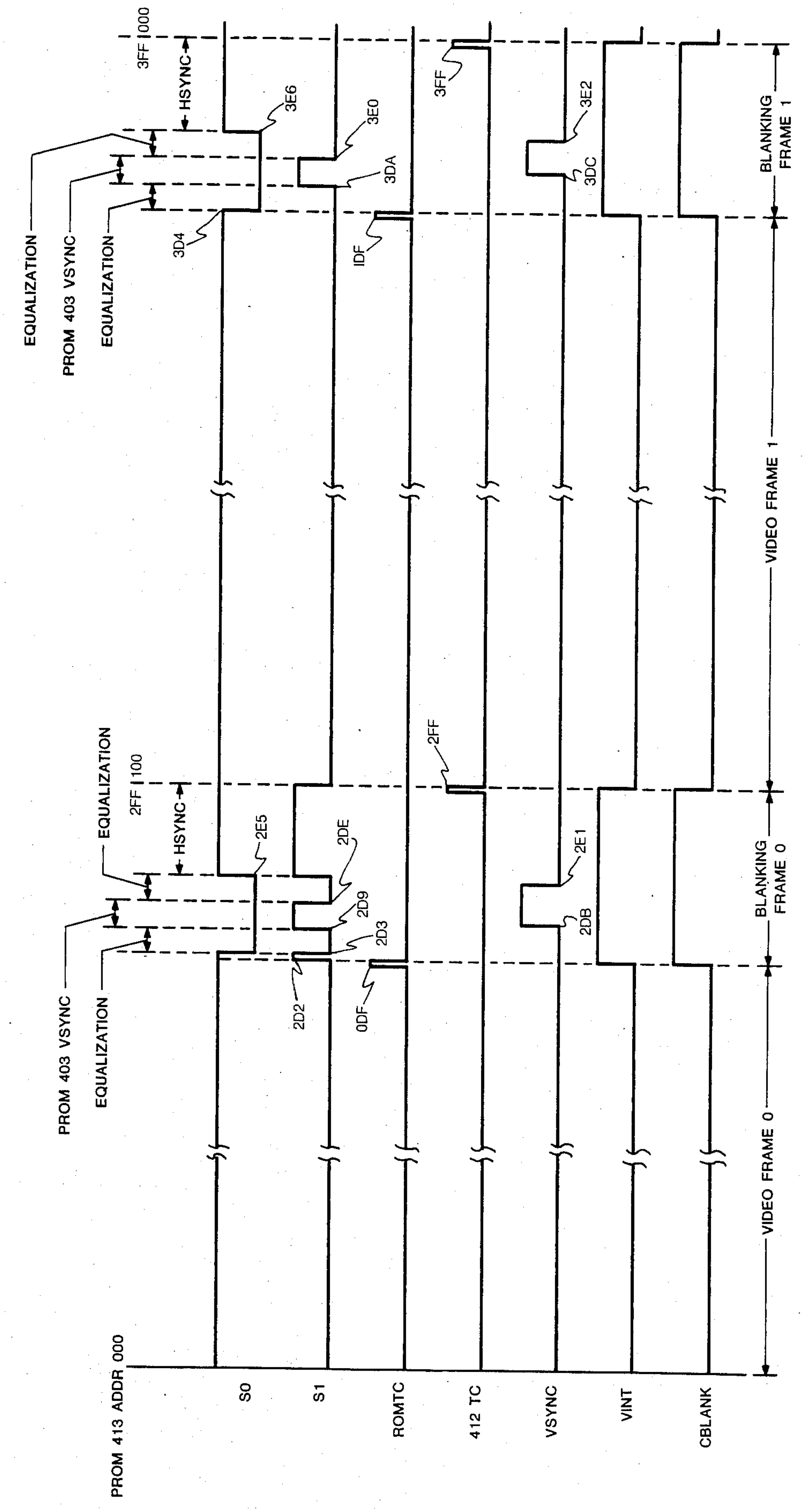
FIG. 9 is a timing diagram of 15.75, 60 Hz, interlaced vertical timing.

Looking now at FIG. 9 at timing diagram for operation in the 15.75 Khz mode with 60 hertz external power is shown. As discussed above, in the 15.75 Khz mode the screen is scanned in an interlaced fashion and two vertical scans are required to display a complete picture. During the first frame, or frame 0, one-half of the raster lines are scanned with the remainder of the raster lines being scanned during the second pass, or frame 1. As in the 31.5 Khz/60 hertz case described above, counters 410–412 are at 000 at the beginning of the video period for frame 0. The initial address supplied to PROM 413 is 000. The frame 0 video period, therefore, in the 15.75 Khz case uses some of the same PROM 413 memory locations as were used in the 31.5 Khz case. As mentioned above, in the 15.75 mode there are two VCLK pulses during each horizontal scan rather than one as in the 31.5 mode. Counters 410–412 will, therefore, be incremented twice on each scan line and the inputs to PROM 413 during the video period will be the same in either 15.75 or 31.5 mode. The first ROMTC high pulse (not shown in FIG. 9) causes no action since V8 is low. At the second occurrence of the falling edge of ROMTC V8 is high. The output of NAND gate 415 is now low causing counters 410–412 to be loaded to address FD2, thereby supplying address 2D2 to PROM 413 and initiating the frame 0 blanking interval.

Referring briefly back to FIG. 6, SRLD.L has a period of 1120 nanoseconds in the 15.75 Khz mode. Counters 401 and 402 are, therefore, clocked at only one half of the 31.5 Khz rate. Counters 410–412, however, are clocked by VCLK at the same rate in either mode since each 15.75 Khz horizontal scan cycle generates two equally spaced VCLK pulses, compared to only one VCLK pulse in each 31.5 Khz orizontal scan. S1 goes high for one VCLK period (i.e. ½ of a horizontal scan line). At PROM 413 address 2D3, S0 and S1 return low and the next rising edge of NOT C560 starts the equalization/synchronization/equalization periods. These periods are of the same duration (6 VCLK pulses) as in the 31.5 Khz case.

At PROM address 2E5 the horizontal synchronization period is initiated. This period continues until PROM address 2FF at which time counters 410–412 contain FFF and the TC output of counter 412 goes high. At the next VCLK pulse counters 410–412 will reset to a count of 000. The TC output of counter 412 is provided to the J and K inputs of flip flop 416 and at the next NOT VCLK falling edge the Q output of flip flop 416 will go high and the NOT Q output will go low, thereby indicating the initiation of Frame 1. Since the Q output of flip flop 416 is now high, a high signal is provided to input A8 of PROM 413. Therefore, the initial address provided to PROM 413 in Frame 1 is 100. No change in the four outputs of PROM 413, except for the first high pulse of ROMTC (not shown) occurs between PROM address 100 and the second occurrence of PROM address 1DF, at which time ROMTC again goes high. Since V8 is high at the second ROMTC high pulse, a low signal is asserted at the PE inputs of counters 410–412 thereby causing them to preload to FD4 and to present the address 3D4 to PROM 413. At ROM address 3D4, S0 goes low again initiating the equalization/synchronization/equalization periods discussed above. At address 3E6, S0 and S1 both go high to initiate the horizontal synchronization period. At PROM address 3FF the TC output of counter 412 again goes high and at the next VCLK pulse the counters are again reset to 000.

The 46 VCLK pulses between RAM 413 addresses 2D2 and 2FF in the Frame 0 blanking sequence are therefore equal to 23 horizontal scan lines. The 44 VCLK pulses between RAM 413 addresses 3D4 and 3FF in the Frame 1 blanking sequence are equal to 22 horizontal scan lines. The total of the Frame 0 and Frame 1 blanking scan lines, therefore, equals the 45 horizontal scan lines which occur during 31.5 Khz blanking.

Figure 10:
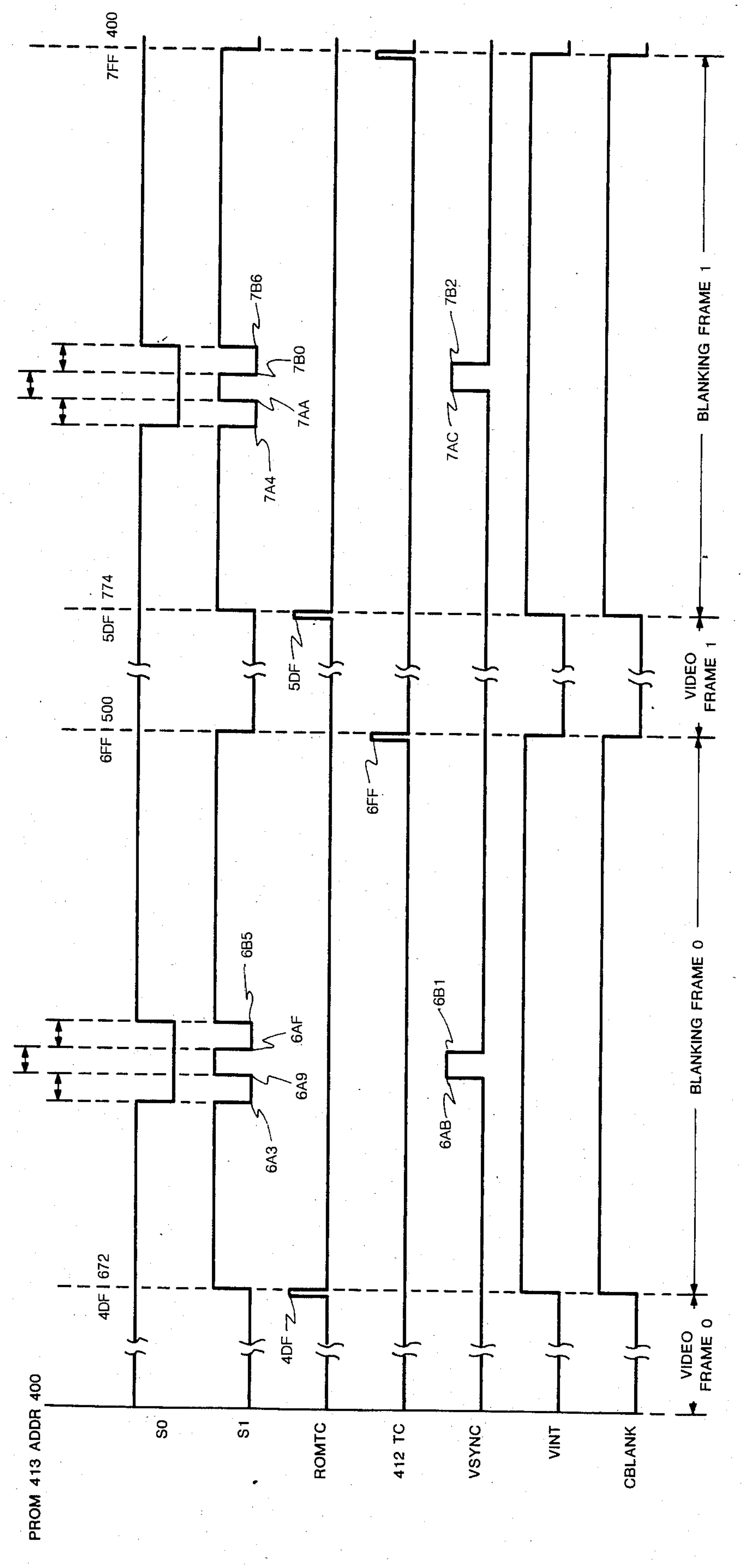
FIG. 10 is a timing diagram of 15.75, 50 Hz interlaced vertical timing.

Finally, looking at FIG. 10 a timing diagram for operation in the 15.75 mode with a 50 hertz external power supply is given. It can be seen that the frame 0 and frame 1 video time periods are the same in both 50 hertz and 60 hertz operation, but as explained above, the blanking time periods in the 50 Hz situation are expanded to take care of the extra time per vertical scan required. Once again counters 410–412 start at 000 at the beginning of the video portion of Frame 0. Since the 50 hertz mode is involved, input A10 (60 HZ.L) to PROM 413 will be high therefore, the initial PROM address at the beginning of video frame 0 will be 400. Again no changes in the four outputs of PROM 413, except the first ROMTC pulse (not shown), occur between PROM address 400 and the second occurrence of PROM address 4DF at which time ROMTC again goes high. Since V8 is high at the second ROMTC occurrence, a low signal is seen by PE inputs of counters 410–412 causing them to be preloaded to F72 and causing a PROM 413 address of 672. At PROM address 672 output S1 goes high initiating a horizontal synchronization period until PROM address 6A3 at which time S0 and S1 both go low initiating the equalization/vertical synchronization/equalization periods again. At PROM address 6B5 both S0 and S1 again go high initiating a second horizontal synchronization period. At PROM 413 address 6FF the TC output of counter 412 again goes high and at the next VCLK pulse the counters again reset to 000. The TC output of counter 412 is provided to the J and K inputs of flip flop 416 where at the next falling edge of NOT VCLK, the Q output of flip flop 416 goes high and the NOT Q output goes low. Since the Q output of flip flop 416 is now high, the address 500 is presented to PROM 413 during frame 1 video. Except for ROMTC, no changes occur in the outputs of PROM 413 until the second occurrence of PROM address 5DF when ROMTC again goes high. Again a low signal is seen at the PE inputs of counters 410–412 and they are preloaded to a count of F74 which results in an address to PROM 413 of 774. S1 goes high initiating a horizontal address 7 7B6, S0 and S1 again go high initiating a second horizontal synchronization period. At PROM address 7FF the TC output of 412 again goes high and the next VCLK signal counters are once more reset to 000. This again presents the address 400 to PROM 413 and the frame 1 video begins again.

The 142 VCLK pulses between PROM 413 addresses 672 and 6FF in the Frame 0 blanking period are equal to 71 horizontal scan periods. The 140 VCLK pulses between PROM 413 addresses 774 and 7FF in the Frame 1 blanking equal 70 horizontal scan periods for a total of 141 periods total. This equals the 141 horizontal scan lines during the 31.5 Khz blanking period.

In summary, the present invention provides apparatus for accommodating a standard 15.75 Khz interlaced monitor or a higher resolution 315 Khz non-interlaced monitor. In addition, the invention can accommodate refresh rates of either 50 Hz or 60 Hz. The invention may be embodied in yet other specific forms without departing from the spirit or essential characteristics thereof. The present embodiments are therefore to be considered in all respects as illustrative and not restrictive. The scope of the invention is indicated by the appended claims rather than by the foregoing description, and all changes which come within the meaning and range of equivalency of the claims are therefore intended to be embraced therein.

We claim:

1. Apparatus for generating video synchronization signals in a raster scan display terminal having plural selectable scan modes and plural selectable scan rates, said apparatus comprising:

- means for generating a timing signal based on the scan mode selected;
- means responsive to said timing signal for counting incremental positions along each horizontal scan line;
- means for counting horizontal scan lines;
- first logic means, responsive to an output of said horizontal scan line counting means and to the selected scan mode of the terminal, for indicating a field to be displayed;

second logic means, responsive to the outputs of said horizontal scan line counting means and to the output of said first logic means, for generating output signals;

third logic means responsive to the outputs of said incremental counting means, to the output signals of said second logic means and to the selected scan rate for generating said video synchronization signals; and means for loading said horizontal scan line counting means to a value based on at least the selected scan mode and the output of said first logic means.

2. The apparatus of claim 1 wherein said video synchronization signals include a composite synchronization signal, wherein said second logic means output signals include selection control signals and wherein said third logic means comprises:

memory means, responsive to the outputs of said incremental counting means and to the selected scan rate, having a plurality of outputs; and selection means responsive to said selection control signals for selecting one of said plurality of outputs of said memory means as said composite synchronization signal.

3. The apparatus of claim 1 wherein said third logic means also generates a video blanking signal.

4. The apparatus of claim 1 wherein said third logic means also provides a signal which is provided as a clocking input of said horizontal scan line counting means.

5. The apparatus of claim 1 wherein the value loaded in said horizontal scan line counting means is also based on the selected scan rate.

6. In a raster scan display terminal having plural selectable scan modes, plural selectable scan rates, means for counting incremental locations along each horizontal scan line and means for counting horizontal scan lines, a method of generating a monitor synchronization signal comprising the steps of:

clocking the incremental location counting means at a rate based on the scan mode selected:

generating, based on the count from said incremental location counting means and on the scan mode selected, a plurality of monitoring synchronization source signals;

resetting the incremental location counting means to a predetermined count once each horizontal scan period;

clocking the horizontal scan line counting means at a rate which is independent of scan mode selected;

generating, based on the count from said horizontal scan line counting means and on the scan mode selected, indication of a field to be displayed;

generating, based on the count from said horizontal scan line counting means and on said indication of the field to be displayed, selection signals for controlling selection among said plurality of monitor synchronization source signals;

resetting the horizontal scan line counting means at the beginning of each vertical video period and each blanking period to a value based on the scan rate selected, the scan mode selected and said indication of the field to be displayed; and selecting, based on said selection signals, said monitor synchronization signal from said plurality of monitor synchronization source signals.

* * * * *